US005188443A

United States Patent [19]

Lowell et al.

[11] Patent Number: 5,188,443

[45] Date of Patent: Feb. 23, 1993

[54] SHADOW CONTROL SYSTEM

[75] Inventors: Ross Lowell, Katonah; Apiruk Pronputhsri, Long Island City, both of N.Y.

[73] Assignee: Lowel-Light Manufacturing, Inc., Brooklyn, N.Y.

[21] Appl. No.: 848,012

[22] Filed: Mar. 9, 1992

Related U.S. Application Data

[62] Division of Ser. No. 701,496, May 16, 1991, Pat. No. 5,138,530, which is a division of Ser. No. 537,411, Jun. 13, 1990, Pat. No. 5,072,350.

[51] Int. Cl.[5] .......................... G03B 15/02; E04G 3/00

[52] U.S. Cl. .......................................... 362/18; 362/3; 362/351; 362/457; 248/284

[58] Field of Search ........................ 362/3, 16, 18, 351, 362/352, 457; 248/284, 291

[56] References Cited

U.S. PATENT DOCUMENTS 3,852,582 12/1974 Lowell .................................... 362/6

4,832,299 5/1989 Gorton et al. .................. 248/291 X

*Primary Examiner*—Allen M. Ostrager

*Attorney, Agent, or Firm*—Notaro & Michalos

[57] ABSTRACT

A shade control arrangement comprises a shade panel having inner and outer edges with an attachment clamp or attachment clips at the inner edge and additional clips at the outer edge. The outer clips can be used to hold the edge of a gelatin sheet or a perforated sheet to stretch the sheet across a source of light to which a pair of panels is connected using the inner clips or clamp. The clamp comprises inner and outer jaws which form a pocket that can be closed with a screw, at least one of the jaws being pivotally connected between the legs of a U-shaped fork that is detachably connected to the shade panel near the inner edge thereof. A flexible shaft is detachably connected to the clamp. A similarly structured clamp can be used to capture the edge of a flexible sheet that contains a plurality of parallel bend troughs so that the sheet can be bent into a variety of shapes. The arrangement also includes an articulated shade device which comprises a base plate to which are pivotally connected a pair of articulated arms. Each arm is made of rectangular arm segments that are connected to each other in series.

10 Claims, 4 Drawing Sheets

FIG. 4
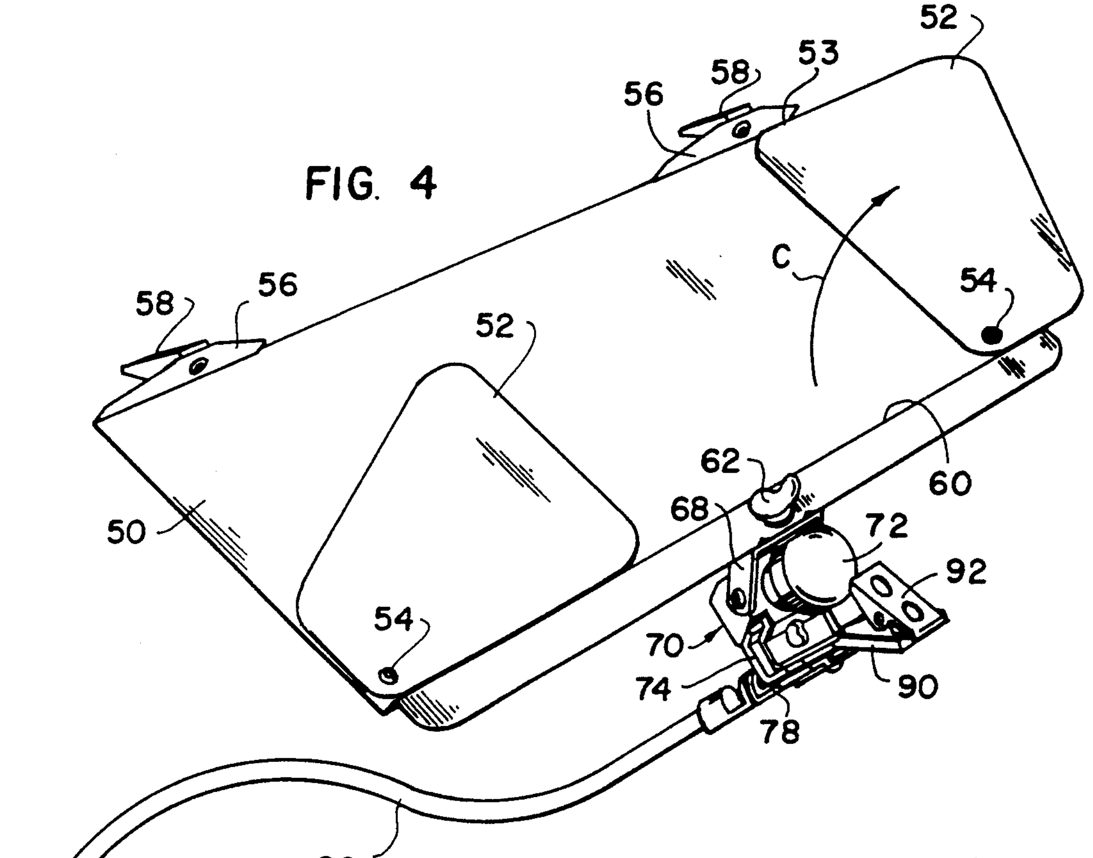
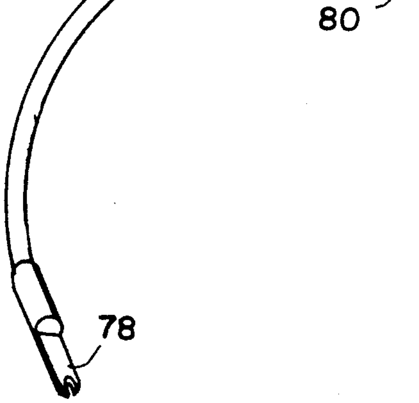
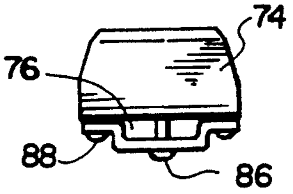
FIG. 5
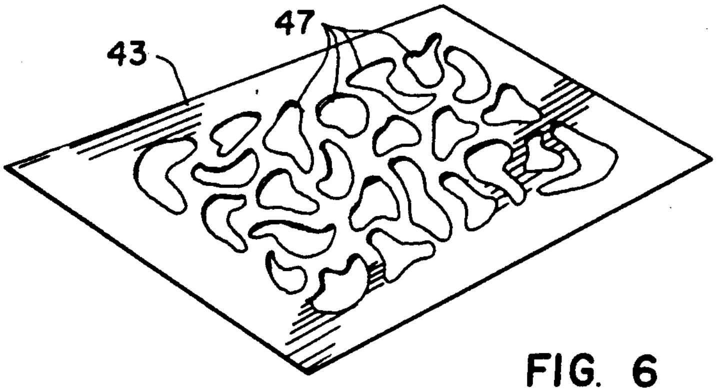
FIG. 6

SHADOW CONTROL SYSTEM

This application is a division of application Ser. No. 07/701,496, filed May 16, 1991 now U.S. Pat. No. 5,138,530, which was a divisional of application Ser. No. 07/537,411, filed Jun. 13, 1990 now U.S. Pat. No. 5,072,350.

FIELD AND BACKGROUND OF THE INVENTION

The present invention relates in general to equipment for controlling the light cast by photographic and non-photographic light fixtures, and in particular to a new and useful system of panels, clamps and accessories which can easily be attached to existing light fixtures or other supports for shading, shaping, modifying and otherwise controlling the light being cast by the fixtures.

The lighting of television, motion picture and still photography scenes is a complicated art and science. This is true whether the lighting is being done on location or in the studio.

Professional lighting can be divided into two areas. The first area consists of selecting and placing the fixtures. The second area involves the practice of controlling and refining the light to make the subject and set more dramatic, more attractive or more mysterious. This is traditionally done with materials that diffuse, shadow and color the "raw" light. The second area is the slow and difficult one, in part, because the tools for refining the light are not always practical or controllable.

Because of the high costs of production, every second spent finessing the light is expensive. Not infrequently, compromises in quality have to be made.

The accurate and convenient control of light is also often required for non-photographic lighting environments. It may be desirable for example, to cast lighting in a restaurant onto a table, wall or plant, while shading the light from guests sitting at the table. Similar requirements may exist in a showroom, gallery, or museum where the light is to be projected onto a product, painting or sculpture while avoiding the lighting of distracting background surfaces. In the environment of an office or home, it may be advantageous to cast light onto a keypad, work materials or work surface, while shading the light from a computer screen or an operator's eyes. In a bedroom environment, carefully shaded light can be used to allow one occupant to sleep in shadow while the other reads in full light.

While some photographic light fixtures are equipped with panels referred to as barn doors, these are generally connected permanently or usable only with a specific fixture. Non-photographic lights rarely have sophisticated shading equipment for directing the light.

Both in photographic and non-photographic environments, it is also sometimes desirable to cover the path of light with light controlling sheets or panels that soften the light, add color to the light, shape the light, or otherwise modify the characteristics of the light generated by the fixture. In the photographic field, such sheets include gelatin sheets, frosted and otherwise translucent screens and panels, light defusing sheets and panels, and perforated panels which are referred to in the trade as "kukalorises".

A co-inventor of the present application has for many years contributed to the field of photographic and non-photographic lighting. U.S. Pat. No. 3,852,582 to Lowel for example, discloses a compact photographic light which is manufactured by the assignee company and is in a class of light fixtures known as "broad lights" because of their capacity to cast broad general lighting. While the broad light of this patent carries pivotally mounted doors or wings which can, to some extent, control the light cast above and below the fixture, additional accessories such as a panel carried by a flexible shaft disclosed in the reference, are advantageously utilized to further control the light. This reference also discloses the use of frames for carrying gelatin sheets, and a channel-shaped receptacle mounted on various parts of the light and accessory equipment which is used for accepting a slotted-tongue provided on various other accessories such as a flexible shaft and panel, for connecting these accessories to the light.

U.S. Pat. Nos. 4,616,384 and 4,544,120 owned by the assignee of the present application also disclose accessories for carrying sheets, panels and other light modifying equipment on various supports such as stands, doors, walls, furniture or other available support structures.

U.S. Pat. No. 4,777,566 to the assignee of the present application discloses a compact light with a versatile panel arrangement which can be used to shape the light cast by the fixture into a variety of beam shapes.

Despite the foregoing advancements, a need remains for equipment which is versatile and easy to use and more precise, for modifying both professional and non-professional lighting to accommodate ever more sophisticated lighting requirements in the shortest possible time.

SUMMARY OF THE INVENTION

The present invention comprises a system of panels, sheets and accessories which are versatile, economical and extremely easy to utilize and manipulate for producing sophisticated effects in shading and directing light.

One element of the present invention is a rigid shade panel having an inner edge with attachment means for connection to a support such as the barn door or rim of a photographic or non-photographic light fixture, a generalized clamp or a flexible shaft for positioning the shade panel in a variety of orientations with respect to a light, and an outer edge with clip means for engaging panels, sheets or other structures that can be used to further modify the light cast by the fixture. The shade panel may be a single rectangular structure or include secondary panels pivotally mounted to a main central panel for movement to a deployed position beyond the side edges of the main panel to increase the area of shade and change the shape of the panel so that it can be used in conjunction with like panels to produce a funnel effect or adjust to larger lights.

Another element of the invention is a versatile clamp structure which comprises a pair of arms that define a pocket that can be closed to hold a variety of support structures such as a rod, the edge of a plate, a rim or bead of cylindrically shaped light, or a specially designed angle member.

Another element of the invention is a thin flexible metal sheet having a pattern of irregular shapes that form a kukaloris that is tailored to particular lighting needs. The kukaloris of the present invention can be manufactured from a clear or colored gelatin sheet on which the pattern is painted with opaque black paint.

The sheet is resistant to high temperatures. Alternatively, the kukaloris of the present invention can be made of a foil having the shapes in the form of punched out areas for light transmission.

In use light shines through the kukaloris and produces abstract shadows and adds mystery and interest to an otherwise blank or bleak wall.

The sheet can be attached between shade panels mounted on a light fixture to cast shadows and light in shapes corresponding to the painted or punched out design.

Another feature of the invention is a thin flexible metal sheet constructed so that it can be cut by heavy scissors. One further embodiment of the metal sheet can be used on home and office lighting in conjunction with a clamp. This sheet has a plurality of straight bending troughs formed into the sheet so that the edges of the sheet can be bent to control the shadows cast by a lighting fixture in a variety of ways, or cut to reduce size.

This metal sheet which can be referred to as an architectural lighting fin which, as with the kukaloris defined above and the so-called Hollywood-strip to be described later, can be used for home, office, showroom, restaurant, museum or general architectural lighting, in addition to photographic uses, where it is important to shine light in certain preferred areas such as against a wall or to highlight a sculpture or painting, and away from the eyes of the viewers. Similarly, the invention can be utilized by artists, draftsman and computer operators, again to keep the light on the areas where it is needed and off areas where it is not desired such as the eyes or a CRT or other computer display where light is detrimental.

Another element of the invention comprises a pair of flat elongated and articulated shade arms which each have one end pivotally connected at a support for mounting to a light fixture or other structure. Each arm comprises a plurality of flat arm segments which are pivotally connected to each other in series for pivoting about an axis extending perpendicular to the plane of the arms, to follow straight, curved or irregular contours. This structure is referred to here as a Hollywood-strip.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTIONS OF THE DRAWINGS

In the drawings:

FIG. 4 is a perspective view of a second embodiment for the rigid shade panel which is shown supported on a flexible shaft by a clamp forming accessories of the invention;

FIG. 5 is a rear elevational view of an angle member used to interconnect the clamp and shaft of the embodiment of FIG. 4;

FIG. 6 is a perspective view showing a second embodiment of the flexible metal sheet of the present invention;

DESCRIPTION OF THE PREFERRED EMBODIMENTS

Figure 1:
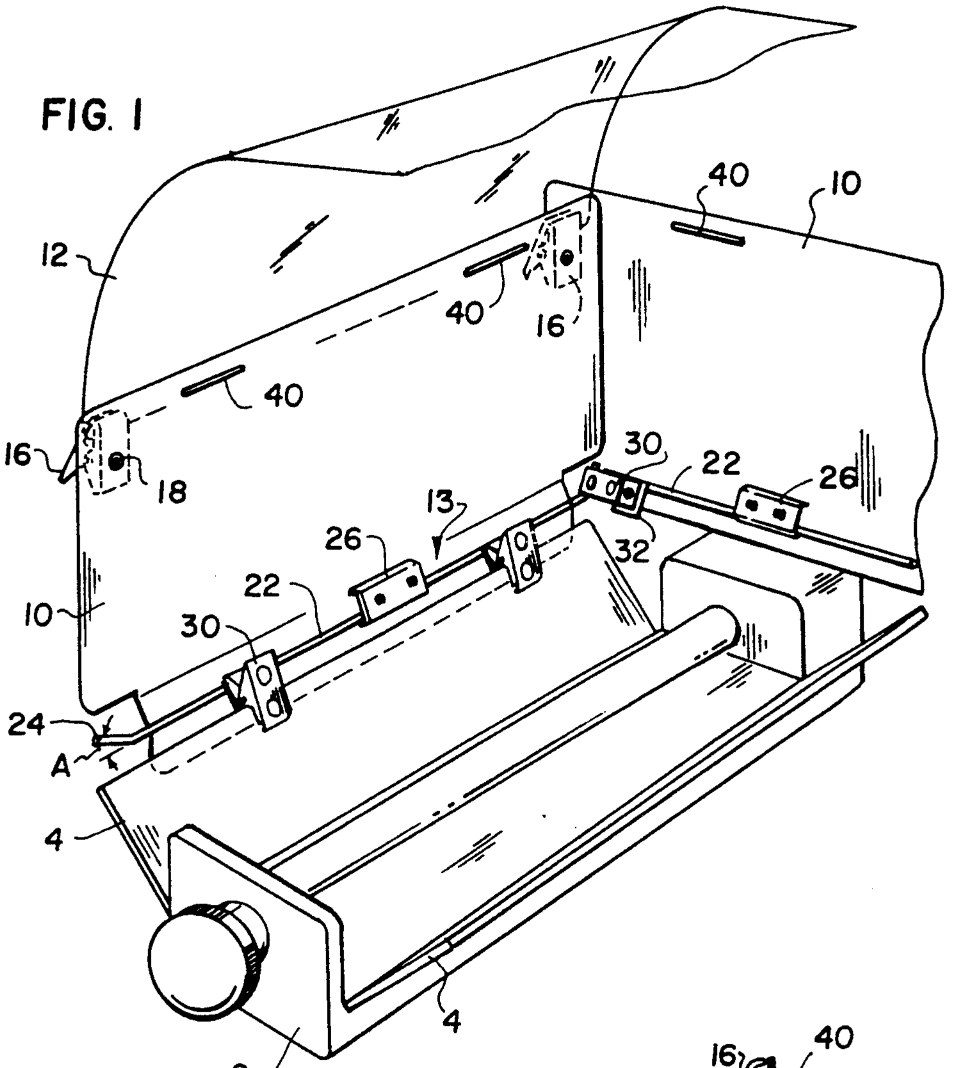
FIG. 1 is a perspective view showing a shade panel in accordance with the present invention mounted on the door of a known photographic lighting fixture.

Referring to the drawings in particular, the invention embodied in FIG. 1 comprises a rigid metal shade panel 10 having an inner edge with attachment means generally designated 13 which are capable of detachably connecting panel 10 to a door 4 which is permanently connected to a broad light 2. Broad light 2 may be of the type which is commercially available from the assignee, Lowel-Light Manufacturing, Inc., and identified by the trademark TOTA-LIGHT.

The upper edge of panel 10 carries clip means in the form of a pair of clips 16 which are pivotally connected to panel 10 by rivets 18 and which can be used for connection to the edge of a light modifying sheet such as a gelatin sheet 12 or to another panel 10. By placing the attachment means on an opposite surface from the chip means, the inner edge of a panel held by chips 16 will overlap the upper edge of the panel shown to trap light and form a ventilating slot between the panels.

Attachment means 13 comprises a rod 22 having opposite bent ends 24 in recessed corners of the panel.

Figure 2:
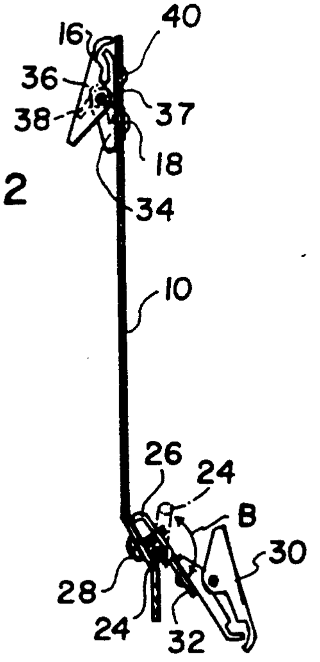
FIG. 2 is a side elevational view, partly in section of the shade panel shown in FIG. 1.

As shown in FIGS. 1 and 2, rod 24 is held to panel 10 near a lower edge and on a bent portion thereof, by a C-shaped bracket 26 and a pair of screws 28 which extend through holes in the panel and are threaded into threaded holes in the bracket 26. By tightening screws 28, rod 22 is securely held while still being able to pivot about its axis and against frictional resistance exerted by the clamping force of bracket 26. A lower lip portion below the attachment means extends behind door 4 to trap light.

A pair of plates 32 are fixed, for example by welding, to rod 22 at spaced locations on opposite sides of the bracket 26. A clip 30 is connected by a rivet to each plate 32 so that each clip can pivot about an axis perpendicular to the axis of rod 22.

Advantageously, the bent ends 24 are at an angle A of about 30 degrees but in any case within the range of 10 to 90 degrees from the axis of rod 22. As shown in FIG. 2, the bent ends 24 are also at an angle B of 150 degrees but in any case within the range of 90 to 180 degrees from the plane containing plates 32.

With a pair of panels 10 connected by clips to the pair of doors 4 of light 2, a second pair of panels 10 (one of which being partially shown in FIG. 1) can be connected at the sides of the first pair of panels by engagement of the clips 30 of the further panels onto the bent ends 24 of the first pair of panels. One of these interconnections is shown in FIG. 1. As shown in FIG. 1, this takes advantage of the capacity of clip 30 to pivot on its plate 32 and further the ability of each plate 32 to pivot with its rod 22 on the panel 10.

The clips 16 on the outer edge of panel 10 may be used to secure opposite edges of the gelatin sheet 12 so that the gelatin sheet can be positioned over the light source to modify the sight at a position which is sufficiently spaced from the light to avoid damage due to heat.

As shown in FIG. 2, clip 16, which is substantially identical to clip 30, comprises a first arm 34 which is pivotally connected by the rivet 18 to the panel 10 near its upper edge for pivoting of clip 16 about an axis of the rivet, and a second arm 36 which is pivotally connected to the first arm by pivot pin 37. A coil spring 38 with radially extending ends embraces pin 37 to bias ends of the first and second arms toward each other to complete the clip.

In order to permit one panel 10 to be clipped to the outer edge of a second panel (not shown), each panel is provided with a pair of clip purchase ridges 40 which are produced by locally indenting the material of panel 10, and which are parallel to the outer edge of the panel and spaced by an equal amount to the spacing of clips 30 on rod 22.

Figure 3:
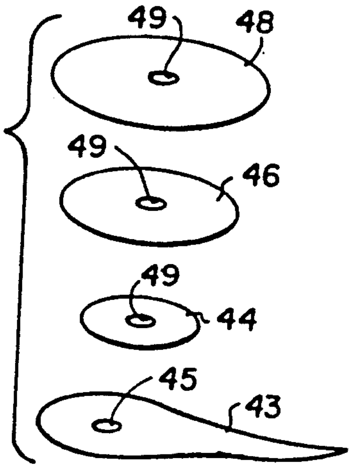
FIG. 3 is a perspective view showing a collection of circular and free-form shapes used in accordance with the present invention.

FIG. 3 illustrates a collection of thin flexible sheet metal forms including different sized circles 44, 46 and 48 each with a hole 49 near the center thereof, and a free form shape 43 also having a hole 45 therein. These shaped members can be held by clips such as those disclosed later in this specification, for eliminating so-called "hot spots" or shade or shadow areas. The holes are used for receiving the clips to avoid obscuring the outer edge contour of the shapes.

FIG. 4 illustrates a further embodiment of the invention comprising a rigid shade panel 50 for use on larger light fixtures. Panel 10 of FIG. 1 may, for example be approximately 4 inches high and 9 inches wide while panel 50 is advantageously approximately 5 inches high and 12 inches wide.

In order to produce an even broader shading affect, side panels 52 have lower corners which are pivotally connected at rivets 54 near lower outer corners of the main panel 50. As shown by arrow C in FIG. 4, each panel 52 can be pivoted outwardly to increase the effective width of the main panel 50. Panels 52 are advantageously trapezoidal in shape or may be triangular. The outer edge of the side panel when deployed, is advantageously at an angle to the side edge of the rectangular main panel 50 so that a pair of panels 52 can be used with a pair of panels 10 which are pivoted to engage against the inclined edges of panels 52 to confine lateral scattering of light. Each upper outer corner of panel 50 carries an inwardly directed angle tab 56. A clip 58 is pivotally connected to each tab 56 to serve a similar function to the clips 16 on the outer edge of panel 10.

Tabs 56 also serve to limit the outward pivoting of side panels 52 by engaging an upper inner corner 53 of the deployed panel 52. Despite the presence of tabs 56, panels 52 are sufficiently flexible to be lifted over tabs 56 when the panels are moved in the direction of arrow C.

In order to support each side panel in its stored position (shown at the left in FIG. 4), the lower edge of the main panel 50 is provided with a shelf 60. Shelf 60 also supports a portion of the lower edge of the deployed panel 52 as shown to the right of FIG. 4.

Figure 7:
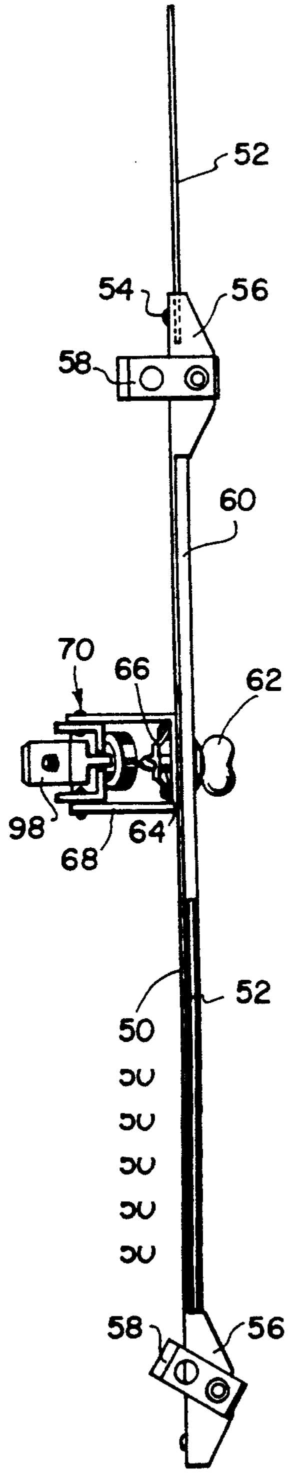
FIG. 7 is a top plan view of the shade panel of FIG. 4.

The attachment means for panel 50 comprises a wing bolt or ¼ turn fastener 62 which is captured within a hole through panel 50 near the lower edge thereof. As shown in FIGS. 4 and 7, wing bolt 62 includes latch stem 64 which, with a ¼ turn of bolt 62, resiliently but firmly engages a latch plate 66 fixed to the base of a U-shaped fork 68 forming part of a clamp generally designated 70. Clamp 70 comprises a pair of arms which define a pocket that can be closed by the turning of a screw 72 to capture an angle member 74 therebetween. As shown in FIG. 5, angle member 74 defines a channel 76 for receiving a slotted tongue 78 connected to the end of a flexible shaft 80. Flexible shaft 80 is advantageously made of aluminum or aluminum alloy to be soft and ductile so that it can be bent into a variety of shapes without breaking or fatiguing. A slotted tongue 78 at the opposite end of shaft 80 can be used to engage receptacles like channel 76 which are provided on a variety of photographic lighting equipment that is distributed by Lowel-Light Manufacturing, Inc. and is disclosed in the above-identified U.S. Pat. No. 3,852,582.

Figure 8:
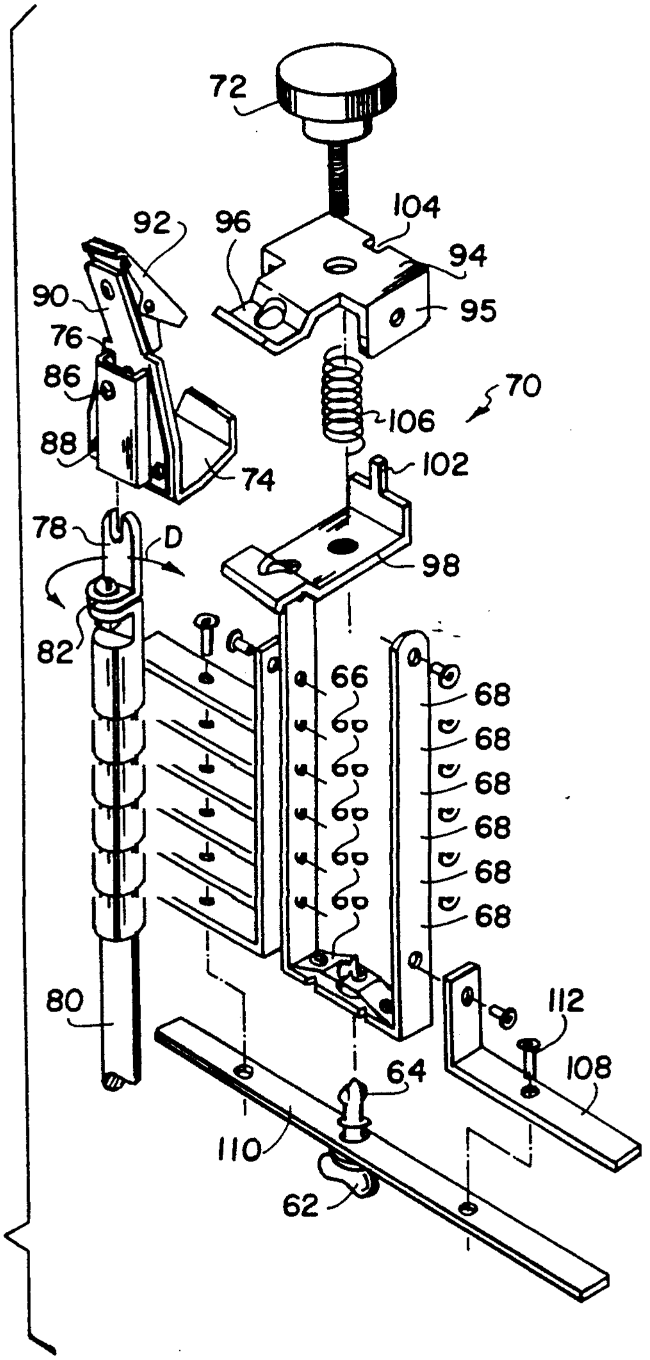
FIG. 8 is an exploded view of an alternate embodiment for the clamp of the present invention.

To provide even more flexibility, and as best shown in FIGS. 4 and 8, the slotted tongue 78 at one end of shaft 80 is formed on an L-shaped member 82 which can rotate in the direction of double arrow D on an axis parallel to shaft 80 and at one end of the shaft 80.

FIG. 4 also shows how channel 76 is formed by a channel member connected to angle member 74 by a long rivet 86 for receiving the slot in the end of tongue 78, and a pair of short rivets 88. Angle member 74 also includes a bent projection which pivotally carries a clip 92 which can be used to clip other structures to the end of shaft 80. Such as the cut disc 48 in FIG. 3.

While FIG. 8 shows an alternate use for clamp 70, the clamp 70 is otherwise identical to the clamp shown in FIGS. 4 and 7. Clamp 70 comprises an outer arm 94 having opposite ears 95 to be pivotally connected by rivets to the legs of U-shaped fork 68. Outer arm 94 also includes an upper bent jaw 96 which cooperates with the lower bent jaw of an inner arm 98 to the clamp. An unthreaded large diameter hole in outer arm 94 receives the shaft of screw 72 which is threaded into a threaded hole provided in inner arm 98. Since the arms 94 and 98 can be pivoted 360 degrees on fork 68, the terms "inner" and "outer" are used only as relative terms.

To prevent relative rotation between the arms, inner arm 98 includes an anti-rotation post 102 which is slidably received in an anti-rotation recess 104 at the rear edge of outer arm 94. A spring 106 urges the arms apart when screw 72 is turned to open the pocket form between the upper and lower jaws.

One end of angle member 74 is shaped to be closely received between the jaws of the clamp 70 for a firm interconnection between the angle member and the clamp that is shown in FIG. 4.

FIG. 8 also shows the use of outward angles 108 which are fixed to the sides of fork 68 by short rivets. Wing or latch bolt 62 with its latch stem 64, is captured, for example by a split washer, in a hole of a holding plate 110. Long rivets 112 loosely interconnect the outward angles 108 to the plate 110 to form a slot between them. Stem 64 has an outer end with opposite projections which enter a hole formed in latch plate 66. Latch plate 66 is made of spring steel and is permanently connected to the base of fork 68. By turning bolt 62 by ¼ turn, the projections of stem 64 rotate in the specially shaped hole to pull plate 110 toward fork 68 and its angles 108 to close the slot.

Figure 9:
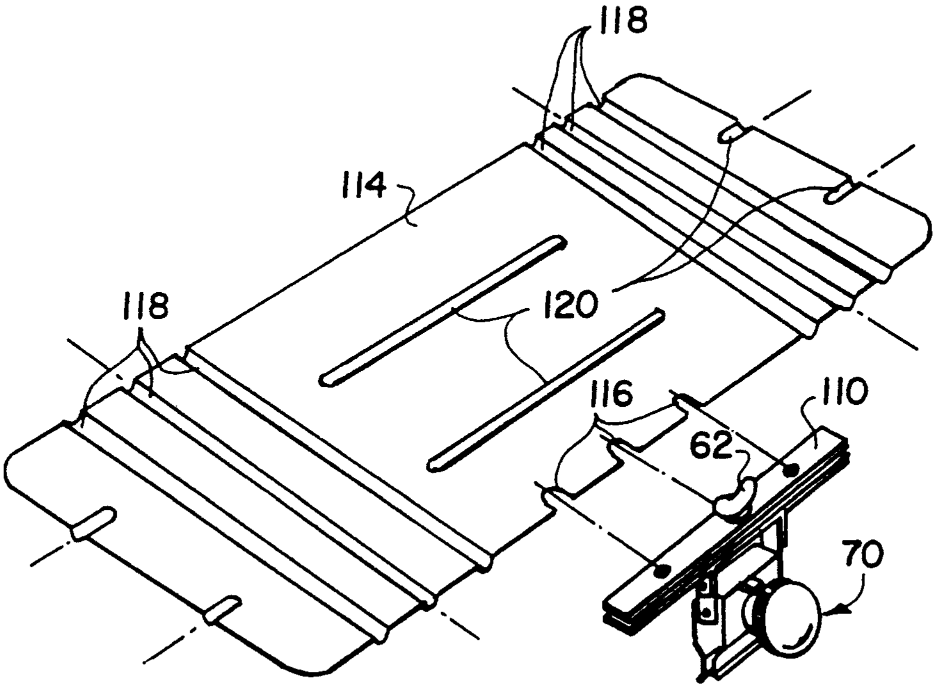
FIG. 9 is an exploded perspective view of a further embodiment for the flexible sheet of the present invention.

As shown in FIG. 9, with the slot between plate 110 and angles 108 open, the inner edge of a thin flexible metal sheet 114 can be received within the slot. With ¼ turn of bolt 62, the slot is closed to firmly capture the edge of sheet 114. Three recesses 116 are defined in the inner edge of sheet 114 for respectively receiving the two long rivets 112 and the stem 64. Other features of sheet 114 include a plurality of parallel bending troughs 118 which are formed in the thin material of sheet 114. This permits the outer edges of the sheet to be bent inwardly or outwardly in any desired manner for funneling and shading light that is used for home and office purposes. Sheet 114 also includes a pair of parallel interrupted troughs 120 which extends transversely to troughs 118 to be used for bending the upper and lower edges of sheet 114. Sheet 114 is advantageously made of thin steel or aluminum material so that it can be cut by a heavy pair of scissors if more accurate light control is desired.

Figure 10:
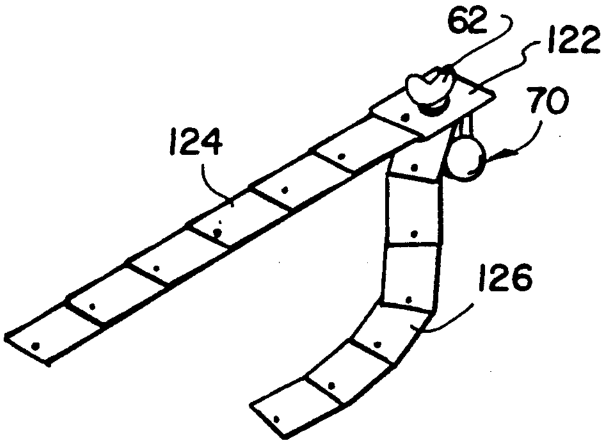
FIG. 10 is a perspective view of an articulated shading structure of the present invention.

FIG. 10 illustrates an articulated shading structure of the present invention which comprises a base plate 122 of thin flexible metal, and a pair of articulated arms 124 and 126 each comprising a plurality of rectangular articulating plates which are pivotally mounted in series to each other by rivets which allow pivoting of each plate with respect to each adjacent plate about an axis which is perpendicular to the plane of the plates. Instead of being rectangular, each articulating plate may have a disc, triangular or other shape. A clamp 70 and ¼ turn fastener 62 can be used to attach the base plate to any desired structure. The ¼ fastener 62 is a piece of known hardware.

In use, the articulated arms 124 and 126 can be used to cast a very accurately shaped shadow. One example of use is to bend the arms into oppositely directed arches which form a central lighted area that can be used as light on the face of a subject, while darkening clothing or a bald head, for example.

All of the structures shown in FIGS. 1 through 10 are advantageously flat black in color and may be anodized to produce a rugged wear and scratch resistant surface.

Sheets 42 and 43 are advantageously 10 by 12 inches in size while sheet 114 is advantageously 5 by 12 inches in size. The articulating plates of 124 and 126 are each advantageously 1½ inches wide and 2½ inches long, although other sizes and proportions are possible.

While specific embodiments of the invention have been shown and described in detail to illustrate the application of the principles of the invention, it will be understood that the invention may be embodied otherwise without departing from such principles.

What is claimed is:

1. A clamp arrangement comprising:

a fork having a base and a pair of legs extending from said base, an outer clamp arm pivotally mounted between said legs, an inner clamp arm, a screw connected between said inner and outer clamp arms for moving said clamp arms toward each other to close a pocket formed between said clamp arms, one of said clamp arms having an anti-rotation recess and the other of said clamp arms having an anti-rotation post slidably engaged in side anti-rotation recess with movement of said clamp arms toward each other.

2. An arrangement according to claim 1, including a resilient latch plate having a shaped opening therein and connected to said base, and a latch bolt engagable through and rotatable in said shaped opening for detachably connecting said latch bolt to said fork.

3. An arrangement according to claim 2, wherein each of said arms includes a bent jaw for defining said pocket between said arms.

4. An arrangement according to claim 3, including an outwardly extending angle connected to each leg of said fork, said angles extending on opposite sides of said fork, a holding plate loosely connected to said angles for defining a slot between said angles and said holding plate, said latch bolt being permanently connected to said holding plate and engagable with said latch plate for closing said slot whereby a shade panel can be trapped between said angles and said holding plate to connect said shade panel to said clamp.

5. An arrangement according to claim 4, including a flexible shade panel having inner and outer edges, said panel having at least one recess in said inner edge for receiving said latch bolt when the lower edge of said panel is engaged within said slot, said panel including a plurality of parallel bend troughs for bending portions of said panel.

6. An arrangement according to claim 5, including a plurality of interrupted bend troughs extending transversely to said first mentioned bend troughs.

7. A clamp arrangement according to claim 1 including, in combination, a shade panel comprising a planar opaque flexible panel member having inner and outer edges and a pair of side edges, a plurality of bend troughs extending parallel to said side edges and being spaced from each other to stiffen and for bending of said panel, and at least one recess in said inner edge, said arrangement including means for connecting said base of said fork to said panel at said inner edge thereof, and engaging said at least one recess.

8. A clamp arrangement according to claim 7 wherein said panel includes a plurality of interrupted bend troughs extending transversely to said first mentioned troughs, all of said troughs acting to stiffen said panel.

9. A clamp arrangement according to claim 7 wherein said means for connecting said panel to said fork comprises a resilient latch plate having a shaped opening therein and connected to said base, and a latch bolt engageable through and rotatable in said shaped opening for detachably connecting said latch bolt to said fork, and for engagement in said recess of said inner edge.

10. A clamp arrangement according to claim 7 wherein at least one of said inner and outer clamp arms includes a bend jaw for defining a pocket between said arms.

* * * * *